(12) United States Patent
You et al.

(10) Patent No.: US 7,711,974 B1
(45) Date of Patent: May 4, 2010

(54) SCLK AUTO-DETECTION AND GENERATION IN VARIOUS SERIAL PORT MODES

(75) Inventors: Zhong You, Austin, TX (US); Jieren Bian, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 784 days.

(21) Appl. No.: 11/540,443

(22) Filed: Sep. 29, 2006

(51) Int. Cl.
*G06F 1/00* (2006.01)
*H03M 1/66* (2006.01)

(52) U.S. Cl. .................. 713/500; 341/143; 341/144

(58) Field of Classification Search .................. 713/300, 713/322, 400, 500; 341/143, 144
See application file for complete search history.

(56) References Cited

U.S. PATENT DOCUMENTS

| | | | |
|---|---|---|---|
| H967 H * | 9/1991 | Mariotti | 370/537 |
| 5,594,442 A * | 1/1997 | Paulos et al. | 341/143 |
| 7,113,907 B2 * | 9/2006 | Duewer | 704/212 |
| 7,456,765 B1 * | 11/2008 | Duewer et al. | 341/123 |
| 2006/0091918 A1 * | 5/2006 | Lin | 327/113 |

OTHER PUBLICATIONS

Cirrus Logic, Inc., Model CS4334/5/8/9 "8-Pin, 24-Bit, 96 kHz Stereo D/A Converter", Specification Sheet, DS248F3. Copyright Jul. 2004.

* cited by examiner

*Primary Examiner*—Thomas Lee
*Assistant Examiner*—Zahid Choudhury
(74) *Attorney, Agent, or Firm*—Davis Chin; Steven Lin; Gregory J. Thomas

(57) ABSTRACT

An apparatus and a method for clock mode determination utilizing SCLK auto-detection and generation circuitry at a serial port which has a reduced number of pin-count by eliminating the need for inputting a master input clock signal MCLK and/or a serial input clock signal SCLK. The SCLK auto-detection and generation circuitry includes a SCLK detector circuit, a serial mode detector circuit, an internal SCLK generator circuit, a multiplexer, and an edge detector circuit. The SCLK detector circuit is used to detect whether an external serial clock signal is present and to generate a selection signal. The serial mode detector is used to detect whether an incoming data signal is in a non-TDM mode or a TDM mode and to generate a mode signal.

24 Claims, 12 Drawing Sheets

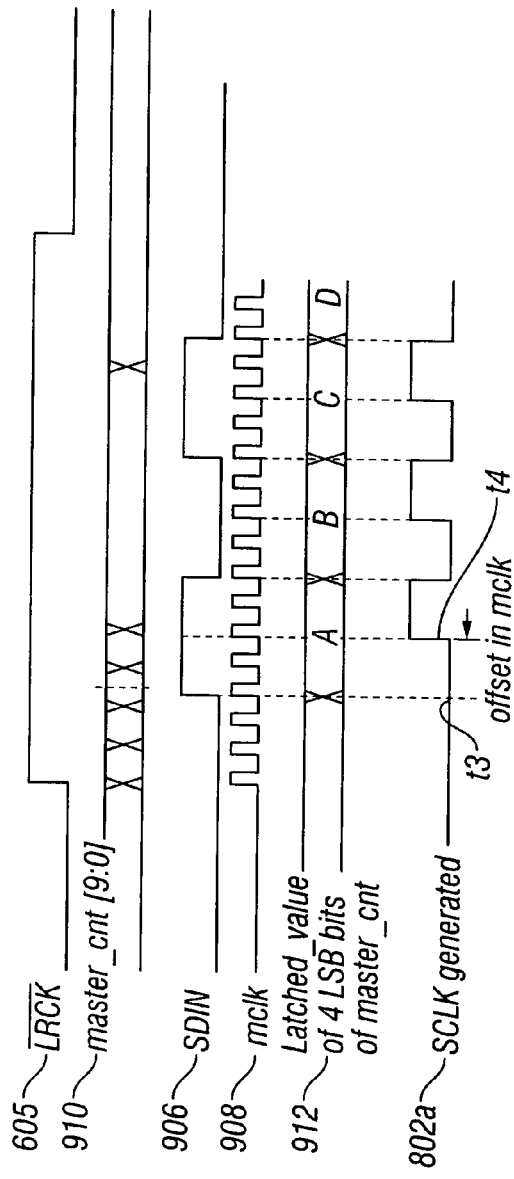
FIG. 10
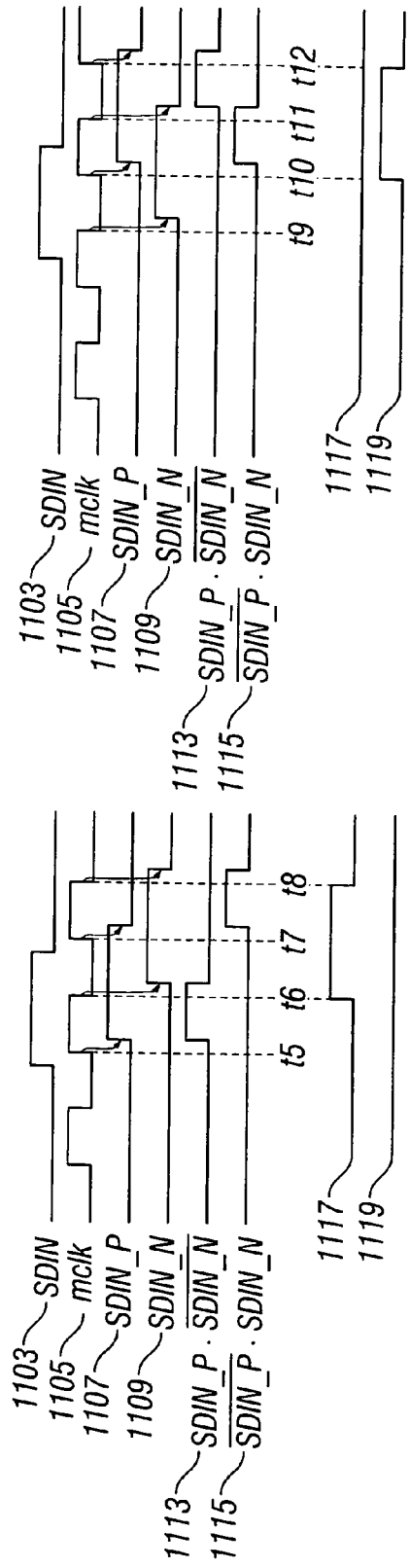
FIG. 12
FIG. 13

SCLK AUTO-DETECTION AND GENERATION IN VARIOUS SERIAL PORT MODES

CROSS-REFERENCE TO RELATED CO-PENDING APPLICATIONS

This application is related to co-pending U.S. application Ser. No. 11/427,910 filed on Jun. 30, 2006, on behalf of Zhong You, Hua Hong, Jeff Baumgartner and Jieren Bian, and entitled "Signal Processing System with Low Bandwidth Phase-Locked Loop," which is assigned to the same assignee as the present invention and is hereby incorporated by reference in its entirety.

BACKGROUND OF THE INVENTION

1. Field of the Invention

The invention relates generally to electronic circuitry for use in data communication systems. More particularly, it relates to a DAC audio system and a method for clock mode determination utilizing SCLK auto-detection and generation circuitry at a serial port in which the number of input pins on an integrated circuit is reduced.

2. Description of the Prior Art

As is generally known, there has been a tremendous amount of growth in the area of electronic circuitry used for data communication systems. These communication systems are frequently used to transmit data and clock signals from a first integrated circuit chip to a second integrated circuit chip. However, due to different design applications, there have been an advent of digital audio signals in various formats, such as I2S and TDM formats. The I2S and TDM formats are two different audio input formats which are commonly used to carry a stereo signal (i.e., a left channel and a right channel). Because of the differences in the way that the data are formatted/encoded, the data in the I2S signals cannot be processed in the same manner that the TDM signals are processed.

In order to be competitive in today's marketplace, digital audio systems must be designed so as to accommodate efficiently the processing of audio inputs in multiple data sampling rate frequencies and/or input formats. While it is possible to design on a single integrated circuit chip the capability of handling or processing of different sampling rates or multiple input formats, this design has typically required the need of additional external circuitry as well as the provision of increased input pins onto the integrated circuit chip. Since an increase in the pin count on the integrated circuit chip will cause both complexities in circuit board design and higher manufacturing and assembly cost, this would generally not be a realistic solution due to the fact that input/output pins are a valuable commodity where space limitations are very critical.

The above-mentioned TDM format is one form of compressed audio data which can be converted to PCM (Pulse-Code Modulated) data with a digital audio receiver chip. The conventional standard PCM data includes a high rate, external master input clock signal MCLK; a left-right input clock signal LRCK, which is used to select between the left and right audio channel data; a serial audio data input signal SDIN containing signal information at the MCLK rate; and a serial input clock signal SCLK, which times the transfer of individual bits of the samples of serial audio data.

FIG. 1 is a block diagram of a traditional DAC (digital-to-analog) audio system 100 suitable for illustrating one of the prior art systems. In particular, the audio system 100 includes a digital signal processor (DSP) 102 which forms a part of digital audio source, such as a CD player or digital audio tape player. The DSP 102 provides four signals to an audio DAC (digital-to-analog converter) 104 which consists of a master clock signal MCLK on line 108; an input data signal SDIN on line 110, which are the actual sample values to be reproduced at the audio outputs; a left-right clock LRCK on line 112, which alternates between an indication that the input data belongs to the left channel or to the right channel; and a serial clock SCLK on line 114, which is used to write the input data SDIN into a receiving buffer.

The three signals LRCK, SCLK and SDIN from the DSP 102 are connected to a digital interpolation filter and delta-sigma modulator block 116 via a serial input port 106. The signal MCLK is connected directly to the modulator block 116 of the audio DAC 104. The resulting analog (audio) signal from the modulator block 116 is fed to an analog driver block 118 for further processing on an analog output line 120. This traditional audio system 100 suffers from the drawback of using a high number of input pins, which increases manufacturing cost and adds complexity to circuit board design.

FIG. 2 is a block diagram of another prior art DAC audio system 200. The audio system 200 includes a DSP 202 which provides three signals to an audio DAC 204. The three signals LRCK, SCLK and SDIN on respective lines 212, 214 and 210 are connected from the DSP 202 to a digital interpolation filter and delta-sigma modulator block 216 of the audio DAC 204 via a serial input port 206. The signal LRCK on line 212 is also connected to the modulator block 216 via a PLL (phase-locked loop) block 222.

The PLL block 222 receives the signal LRCK on line 224 and multiples the same by a predetermined factor in order to generate a phase-locked loop output signal PLLOUT corresponding to a master clock mclk on line 226. The resulting analog (audio) signal from the modulator block 216 is fed to an analog driver block 218 for further processing on an analog output line 220. This technique of using a PLL block for generating a master clock mclk is illustrated and described in the aforementioned U.S. Ser. No. 11/427,910. While this audio system 200 has reduced the number of input pins over the one in FIG. 1, it has the disadvantage in that an external serial input clock signal SCLK is still required to be used.

FIG. 3 is a block diagram of still another prior art DAC audio system 300. The audio system 300 is quite similar to the system 100 of FIG. 1. Specifically, the audio system 300 includes a DSP 302 which provides four signals to an audio DAC 304. These four signals MCLK, SCLK, LRCK and SDIN on respective lines 308, 314, 312 and 310 are connected from the DSP 302 to a digital interpolation filter and delta-sigma modulator block 316 of the audio DAC 304 via a divider network 324 and a serial input port 306. The signal MCLK on the line 308 is also connected directly to the modulator block 316. The audio system 300 suffers from the disadvantage that once the external SCLK mode is latched, it cannot be switched back to an internal SCLK mode. Since it uses a simple divider for dividing down the master clock MCLK in order to generate the serial clock SCLK, the edge may be inaccurate with respect to the input data SDIN. Further, this audio system 300 has the problem that it does not support the TDM (time-division-multiplexing) mode of operation.

The prior art DAC audio system 300 of FIG. 3 has been manufactured as an integrated circuit chip and is commercially available from Cirrus Logic, Inc. of Austin, Tex. under their Part No. CS4434/5/8/9. The I.C. chip is a complete, stereo DAC output system which includes interpolation, 1-bit D/A conversion, and output analog filtering in an 8-pin package.

In order to address the problem of increased pin-count on the integrated circuit chip, the inventors of the present invention have developed SCLK auto-detection and generation circuitry for use at a serial input port in a DAC audio system which has a reduced number of pin-count by eliminating the need for inputting the master input clock signal MCLK and/or the serial input clock signal SCLK.

Accordingly, it would therefore be desirable to provide new and novel SCLK auto-detection and generation circuitry for use at a serial port in a DAC audio system which has a reduced number of pin-count and safe data capture. This is achieved without the use of a master input clock signal and/or a serial input clock signal so as to reduce the number of input pins on the integrated circuit chip. It would also be expedient to detect which of several possible modes of operation at the serial port is being received when an internally-generated serial clock signal is to be outputted.

SUMMARY OF THE INVENTION

Accordingly, it is a general object of the present invention to provide a DAC audio system and a method for clock mode determination utilizing SCLK auto-detection and generation circuitry at a serial port which overcomes all of the disadvantages of the prior art.

It is an object of the present invention to provide a DAC audio system and a method for clock mode determination utilizing SCLK auto-detection and generation circuitry at a serial port which has a reduced number of pin-count by eliminating the need for inputting a master input clock signal MCLK and/or a serial input clock signal SCLK.

It is another object of the present invention to provide SCLK auto-detection and generation circuitry for use in a DAC audio system and a method for auto-detecting whether or not there is present a serial input clock signal in various types of modes of operation at a serial port.

It is still another object of the present invention to provide SCLK auto-detection and generation circuitry for use in a DAC audio system for detecting which of several possible modes of operation at a serial port is being received when an internally-generated serial clock signal is to be outputted.

In a preferred embodiment of the present invention, there is provided SCLK auto-detection and generation circuitry for use in a DAC audio system which includes a SCLK detector circuit, a serial mode detector circuit, an internal SCLK generator circuit, a multiplexer, and an edge detector circuit. The SCLK detector circuit is used to detect whether or not an external serial clock signal is present and to generate a selection signal. The serial mode detector is used to detect whether an incoming data signal is in a non-TDM mode or a TDM mode and to generate a mode signal which is low for the non-TDM mode and is high in the TDM mode. The internal SCLK generator circuit is responsive to the mode signal and is used to generate a first internal serial clock signal for the non-TDM mode and a second internal serial clock signal for the TDM mode.

The multiplexer is responsive to the selection signal for selecting the external serial clock signal when its presence is detected and for selecting one of the first and second internal serial clock signals when the external serial clock signal is not detected. The edge detector circuit is responsive to an internal master clock signal and a serial data input signal for generating a start point signal. The internal SCLK generator circuit is also responsive to the start point signal so as to ensure safe data capture by proper set-up and hold time when the serial data input signal is being latched in with one of the first and second internal serial clock signals.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 10 is a timing diagram, illustrating the signals on the relevant lines of FIG. 9;

FIG. 12 is a timing diagram, illustrating the signals on the relevant lines of FIG. 11 when the rising edge of the master clock mclk is used;

FIG. 13 is a timing diagram, illustrating the signals on the relevant lines of FIG. 11 when the falling edge of the master clock mclk is used.

DESCRIPTION OF THE PREFERRED EMBODIMENTS

Figure 1:
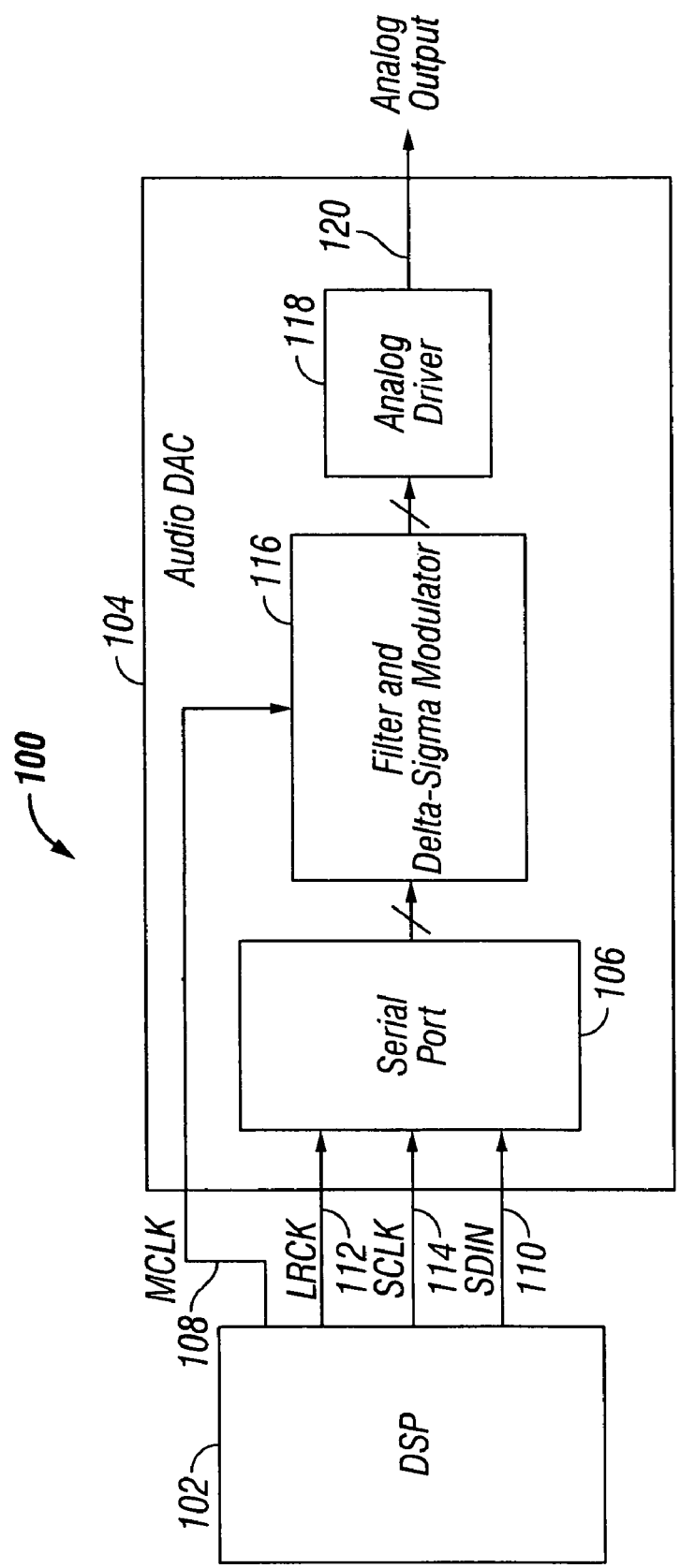
FIG. 1 is a block diagram of a conventional DAC (digital-to-analog) audio system 100, which has been labeled "Prior Art"
Figure 2:
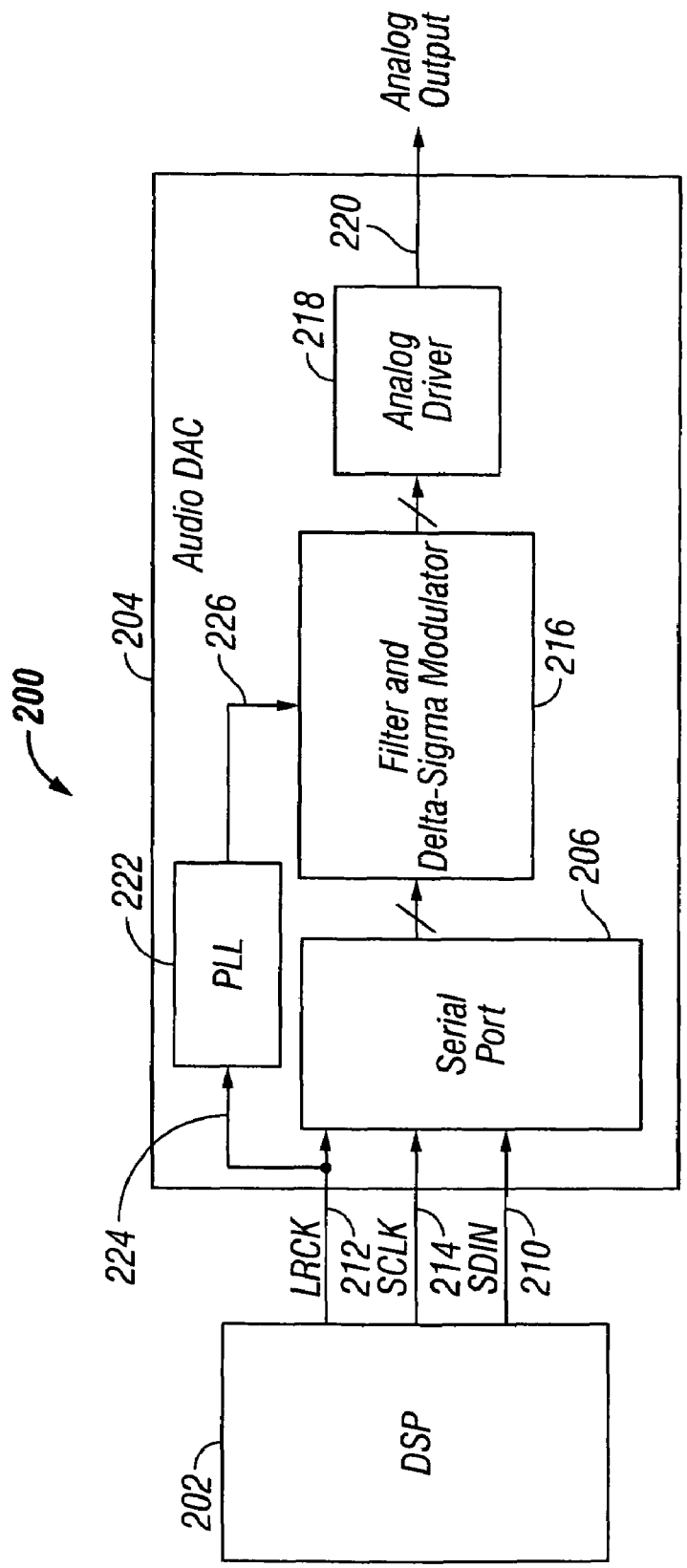
FIG. 2 is a block diagram of another prior art DAC audio system 200, which has been labeled "Prior Art"
Figure 3:
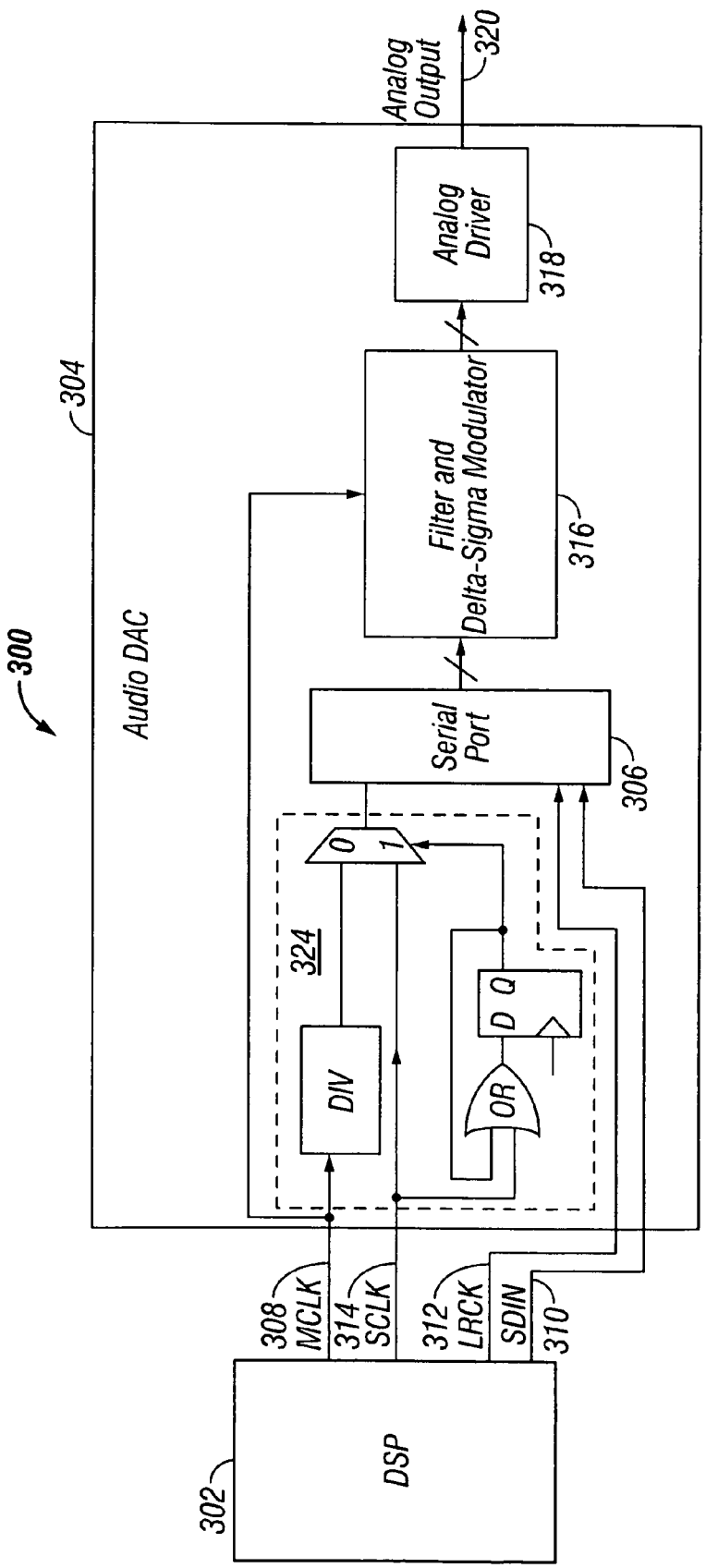
FIG. 3 is a block diagram of still another prior art DAC audio system 300, which has been labeled "Prior Art"

It is to be distinctly understood at the outset that the present invention shown in the drawings and described in detail in conjunction with the preferred embodiments is not intended to serve as a limitation upon the scope or teachings thereof, but is to be considered merely as an exemplification of the principles of the present invention.

Figure 4:
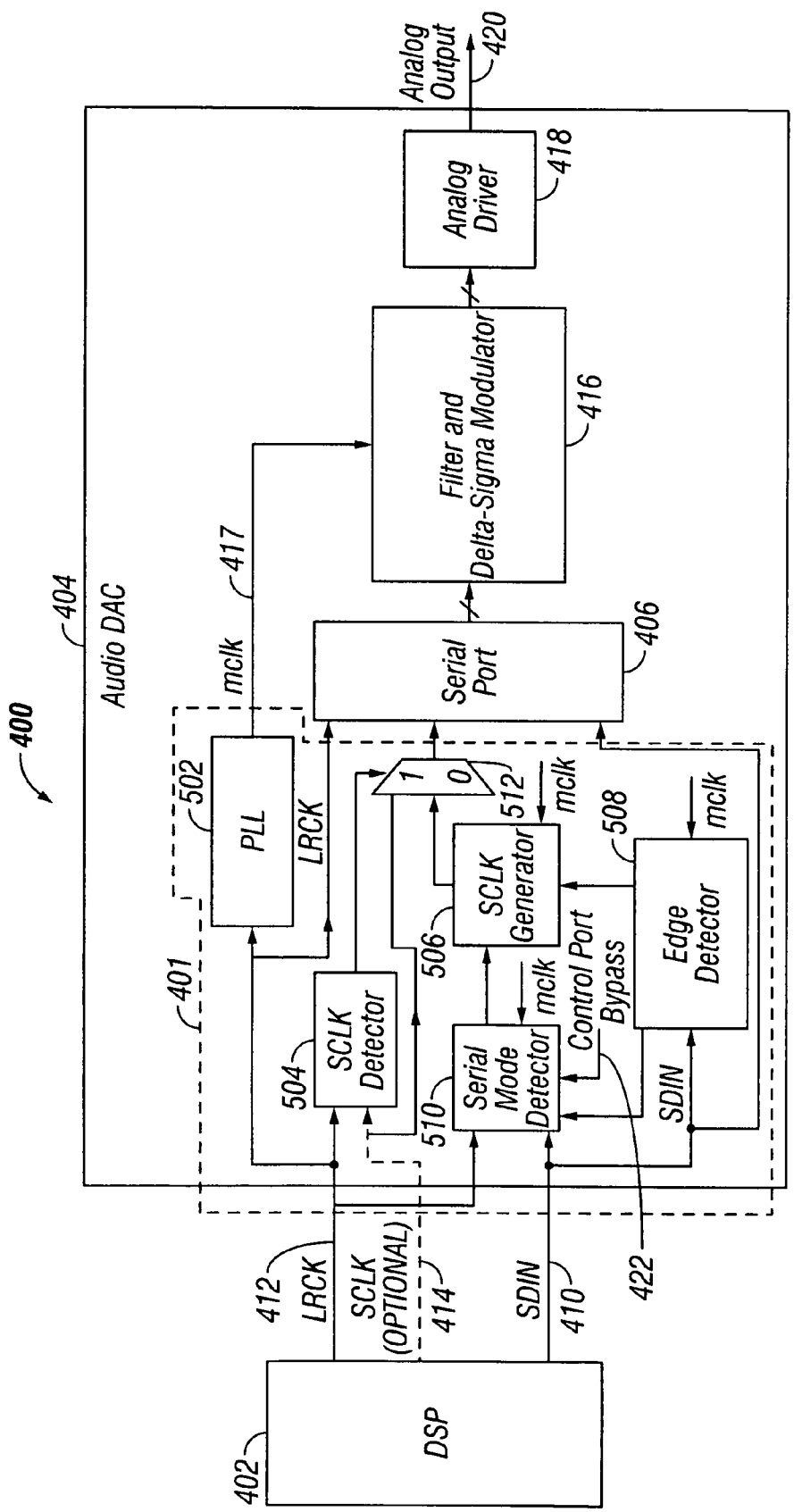
FIG. 4 is a block diagram of a DAC (digital-to-analog) audio system 400 utilizing SCLK auto-detection and generation circuitry, constructed in accordance with the principles of the present invention.

Referring now in detail to the various views of the drawings, there is depicted in FIGS. 4 through 14 a preferred embodiment, constructed in accordance with the principles of the present invention. FIG. 4 is an overall block diagram of a DAC (digital-to-analog converter) audio system 400 which utilizes SCLK auto-detection and generation circuitry 401 of the instant invention. The audio system 400 includes a digital signal processor (DSP) 402 which forms a part of a digital audio source for supplying an input stream of audio digital data signal SDIN on line 410. For instance, the audio digital data may be multiple-bit audio in the PCM format (non-TDM mode) or one-bit audio data in TDM format (TDM mode). The DSP 402 provides only two signals to an audio DAC 404 which consists of a standard left-right clock signal LRCK on line 412, which times the transfer samples of left-channel and right-channel audio data, and the data signal SDIN, which are the sample values to be reproduced at audio outputs.

Since both external and internal serial clock generation modes are supported by the audio system 400, an external serial input clock SCLK on dotted line 414 can be optionally provided by the user. If no external serial input clock is to be connected to the line 414, then the user will simply ground the output pin from the DSP 402 or tie it to a supply voltage. In this case, an internal serial clock int_SCLK will be generated by the circuitry block 401 for use by the audio DAC 404.

The three signals LRCK, int_SCLK/SCLK, and SDIN from the SCLK auto-detection and generation circuitry block 401 are connected to a digital interpolation filter and delta-sigma modulator block 416 via a serial port 406. The internal master clock signal mclk from the block 401 on line 417 is also connected to the modulator block 416. The resulting analog (audio) signal from the modulator block 416 is fed to an analog driver block 418 for further processing on an audio output line 420. The analog output line 420 is coupled externally to amplifiers and speakers (not shown) for audio operation.

Figure 5:
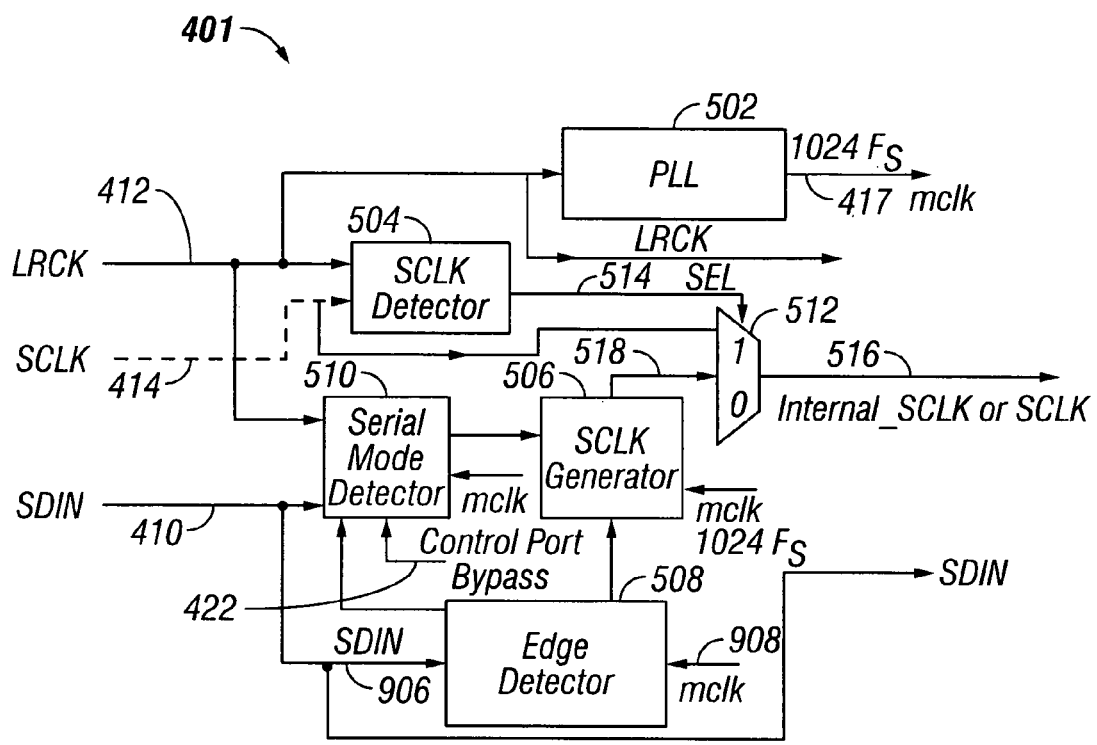
FIG. 5 is an enlarged, block diagram of the SCLK auto-detection circuitry 401 of FIG. 4.

In FIG. 5, there is shown an enlarged, block diagram of the SCLK auto-detection and generation circuitry block 401 of the present invention in FIG. 4. The circuitry block 401 comprises a phase-locked loop (PLL) block 502, a SCLK detector block 504, a SCLK generator block 506, an edge detector block 508, a serial mode detector block 510, and a multiplexer block 512. The PLL block 502 is used to generate a master clock signal mclk on line 417, which is provided by direct frequency multiplication of the left-right input clock LRCK. The description and illustration of the PLL block 502 is provided in the aforementioned U.S. patent application Ser. No. 11/427,910.

The left-right input clock LRCK is also sometimes referred to as a "frame clock" and carries a frequency equal to the sampling rate $F_s$. The frame clock signal serves to identify sample rates and frames two channels of data that exist in a single data stream. Typically, for non-TDM mode, the equally spaced pulses of the frame clock signal LRCK have a fifty percent (50%) duty cycle with the peaks and valleys being assigned to respective left and right audio channels or vice versa. The sampling rates of 48 kHz, 96 kHz, and 192 kHz are common and are referred to herein as "single-speed", "double-speed", and "quad-speed" sampling modes, respectively. In order to convert the PCM data properly, the audio DAC must be set to sample the incoming data at the appropriate rate.

For the single-speed sampling mode, the PLL block 502 will lock on and multiply the LRCK frequency (which is equal to the sampling rate $F_s$) by 1024 in order to generate a master clock mclk on line 417 with a frequency which is equal to $1024*F_s$ or 49.16 MHz. In the double-speed sampling mode, the LRCK frequency will be multiplied by 512 to generate the master clock frequency of 49.16 MHz. Similarly, in the quad sampling mode the LRCK frequency will be multiplied by 256 for generating the master clock frequency of 49.16 MHz. Thus, in spite of the varying sampling rates, the master clock mclk will have a fixed frequency for these different sampling rates.

Figure 6:
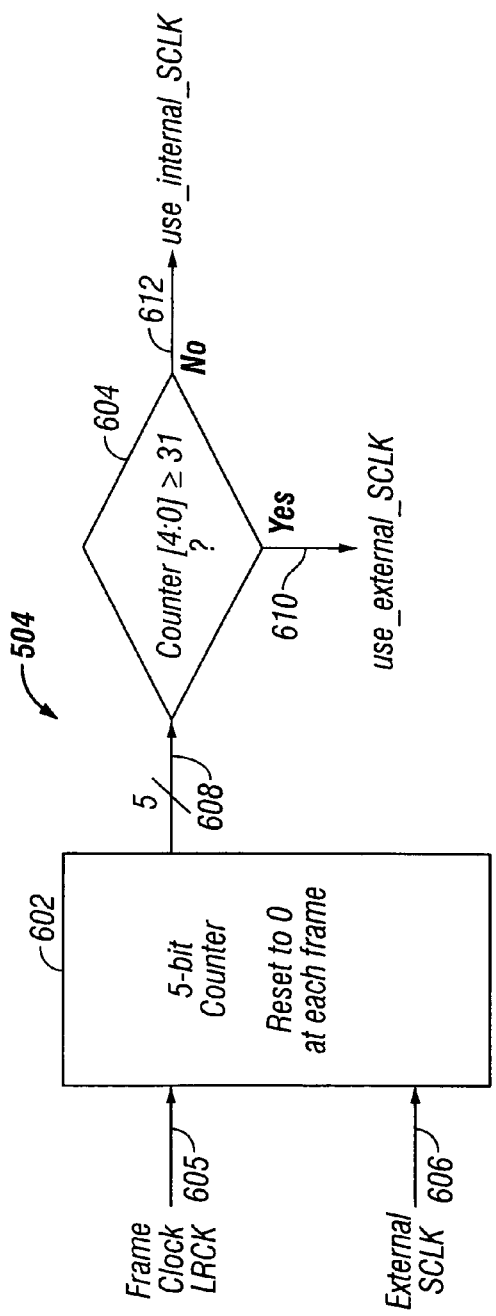
FIG. 6 is a more detailed logic block diagram of the SCLK detection block 504 of FIG. 5.

In FIG. 6, there is shown a more detailed logic block diagram of the SCLK detector block 504 of FIG. 5. The SCLK detector block 504 includes a 5-bit counter 602 and logic block 604. The counter 602 receives the frame clock LRCK on its first input line 605 and the external serial input clock SCLK (from line 414 of FIG. 4) on its second input line 606. The output of the counter on line 608 is connected to the logic block 604.

The counter 602 is triggered by the external serial clock SCLK so as to monitor or count the number of transitions made for each cycle of the frame clock LRCK. If at any time the counter output on the line 608 is equal to or exceeds a decimal 31 or binary 11111 (hexadecimal 1F), the line 610 from the logic block 604 will go high, indicating that the external serial clock SCLK has been detected and is to be used. On the other hand, if at any time the counter output on the line 608 is less than a decimal 31 or binary 11111 (hexadecimal 1F), the internal serial clock int_SCLK will be selected on line 612 from the logic block 604.

Figure 7:
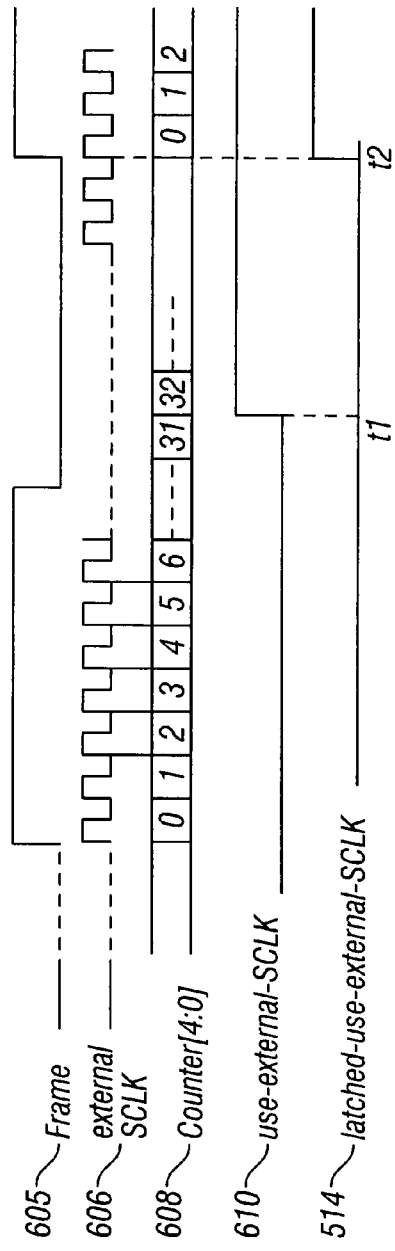
FIG. 7 is a timing diagram, illustrating the signals on the relevant lines of FIG. 6.

In FIG. 7, there is depicted a timing diagram showing the signals at the relevant lines of FIG. 6 when an external serial clock SCLK has been detected. The counter output signal Count [4:0] on the line 608 represents the number of external serial clock cycles on the line 606 counted within the frame clock cycle on the line 605. The counter 602 will be reset at the beginning of each cycle of the frame clock LRCK and will monitor continuously the external serial clock input. Once the counter reaches or exceeds the decimal 31, the signal on the line 610 will go high at time t1. At the end of the frame clock cycle at time t2, the signal latched_use_external_SCLK will be latched high, which corresponds to the signal SEL on line 514 (FIG. 5) that controls the multiplexer 512.

The multiplexer 512 in FIG. 5 will pass the external serial clock SCLK to output line 516 for use by audio DAC when the signal SEL is high. On the other hand, the multiplexer 512 will pass the internally-generated serial clock int_SCLK to the output line 516 for use by the audio DAC when the signal SEL is low.

Figure 8A:
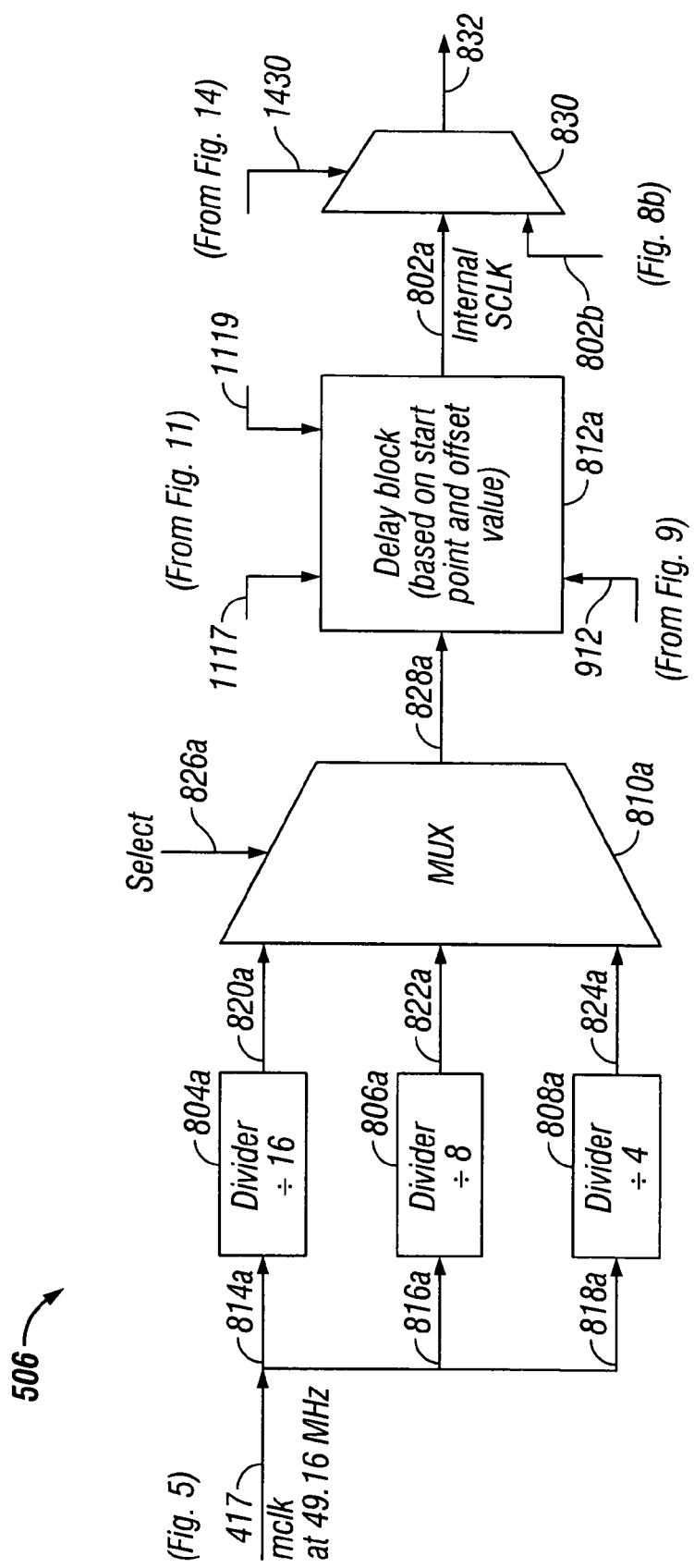
FIGS. 8(a) and 8(b) are more detailed block diagrams of the SCLK generator block 506 of FIG. 5.
Figure 8B:
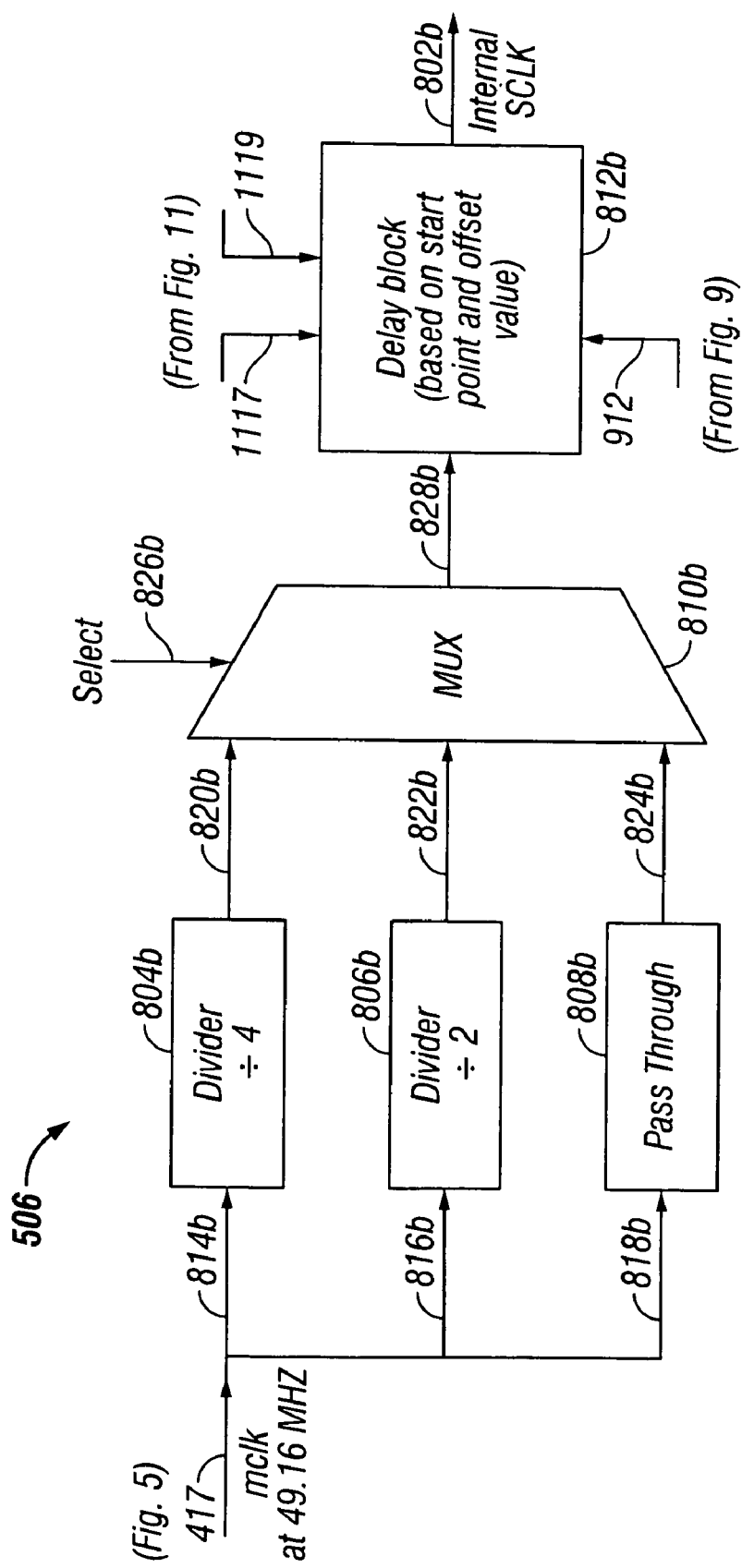

FIGS. 8(a) and 8(b) show more detailed block diagrams of the SCLK generator block 506 of FIG. 5. The generator block 506 will generate on line 802a or 802b an internal serial clock int_SCLK of selected frequencies from a 49.16 MHz master clock signal mclk derived from a left-right input clock LRCK of either 48 kHz, 96 kHz, or 192 kHz sampling rate. In addition, the SCLK signal is generated with an oversampling ratio (SCLK-to-LRCK) of sixty-four (64) for non-TDM modes (I2S format) and of two hundred fifty-six (256) for TDM modes.

As can be seen from FIG. 8(a) for the non-TDM modes, the SCLK generator block 506 comprises a divide-by-sixteen divider 804a, a divide-by-eight divider 806a, a divide-by-four divider 808a, a multiplexer 810a, and a delay block 812a. The dividers 804a-808a receive the master clock signal mclk on corresponding lines 814a-818a and generate a first internal serial clock SCLK1a, a second internal serial clock SCLK2a, and a third internal serial clock SCLK3a on lines 820a-824a, respectively. The multiplexer 810a selects either SCLK1a, SCLK2a, or SCLK3a in response to a select signal SELECT on line 826a and provides the correct one on its output line 828a. The delay block 812a receives the signal on the output line 828a and is responsive to a signal from the edge detector 508 for generating the internal serial clock int_SCLKa on the line 802a.

Similarly, as can be seen from FIG. 8(b) for the TDM modes, the SCLK generator block 506 further comprises a divide-by-four divider 804b, a divide-by-two divider 806b, a pass-through (divide-by-one) divider block 808b, a multiplexer 810b, and a delay block 812b. The dividers 804b-808b receive the master clock signal mclk on corresponding lines 814b-818b and generate a first internal serial clock SCLK1b, a second internal serial clock SCLK2b, and a third internal serial clock SCLK3b on lines 820b-824b, respectively. The multiplexer 810b selects either SCLK1b, SCLK2b, or SCLK3b in response to a select signal SELECT on line 826b and provides the correct one on its output line 828b. The delay block 812b receives the signal on the output line 828b and is responsive to a signal from the edge detector 508 for generating the internal serial clock int_SCLKb on the line 802b.

A 2:1 multiplexer 830 in FIG. 8(a) receives on its first input the internal serial clock int_SCLKa and on its second input the internal serial clock int_SCLKb. When the control signal on line 1430 is low, the multiplexer 830 will pass the internal serial clock int_SCLKa to output line 832. When the control signal on the line 1430 is high, the multiplexer 830 will pass the internal serial clock int_SCLKb to the output line 832. The signal on the output line 832 defines the corresponding internally-generated serial clock signal int_SCLK on line 518 in FIG. 5.

Figure 9:
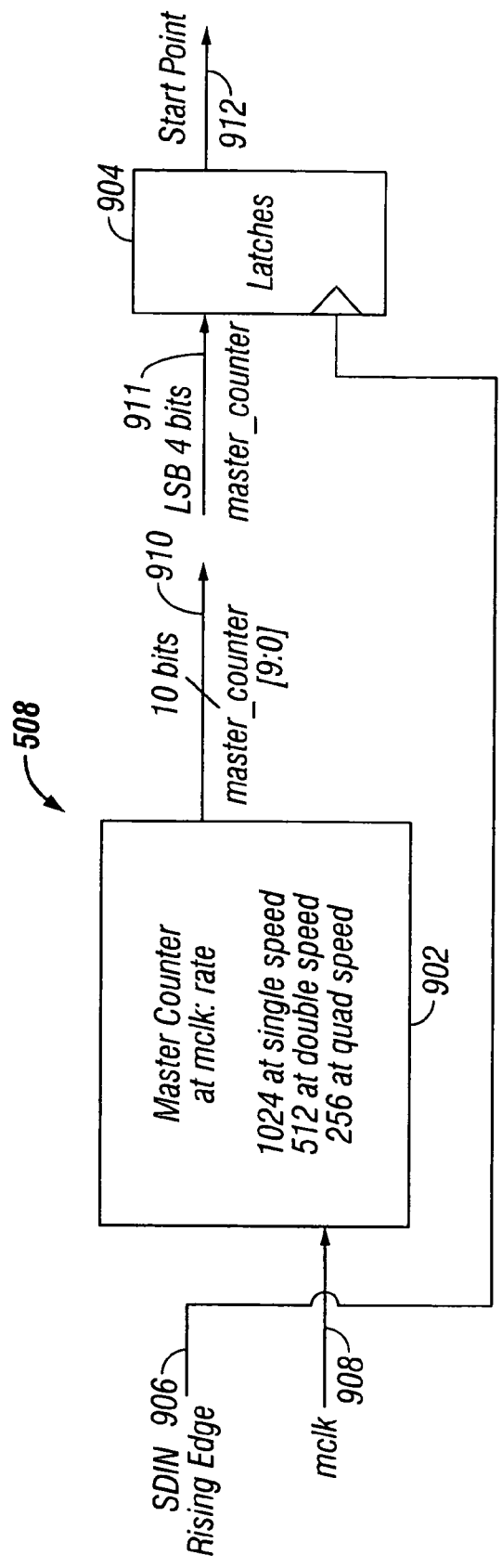
FIG. 9 is a more detailed block diagram of a first portion of the edge detector block 508 of FIG. 5.

FIG. 9 is a more detailed block diagram of the edge detector block 508 of FIG. 5. The edge detector block 508 includes a master counter 902 and latches 904. The edge detector receives the serial data signal SDIN on its first input line 906 and the master clock mclk on its second input line 908. The master counter is a 10-bit counter and is used to count the number of cycles of the master clock mclk which occurs during each period of the serial data input signal SDIN. The master clock mclk rate is 1024*Fs at the single speed mode, 512*Fs at the double speed mode, and 256*Fs at the quad speed mode. The value of the counter is generated on output line 910 as a master count [9:0] signal using a 10-bit output bus.

The 4 least significant bits (LSB) of the master counter 902 on line 911 are latched or stored in the latches 904. The data signal SDIN on the line 906 is used to trigger the latches on the rising edge of the data signal. In this way, the latches are cleared once each cycle of the data signal SDIN. The output line 912 of the latches provides an indication of the start point of the data signal SDIN where the rising edge occurs. In order to ensure proper set up and hold time when latching the data SDIN using the internally-generated serial clock int_SCLK, the transition edge of the data signal SDIN needs to be detected and the rising edge of the serial clock int_SCLK needs to be placed in the middle of each half cycle of the data bit SDIN.

The 4 LSB values A, B, C, and D are not all the same. The value of the offset for the serial clock relative to the rising edge of the data signal are pre-defined and are stored in a look-up table. The value of the offset will be 8 for the single speed, 4 for the double speed, and 2 for quad speed in the non-TDM mode. Similarly, the value of the offset will be 2 for the single speed, 1 for the double speed, and 0 for quad speed in the TDM mode.

FIG. 10 is a timing diagram showing the signals at the relevant lines of FIG. 9 for the quad speed mode in the non-TDM mode. For ease of reference, the frame clock LRCK on the line 605 and the signal master_counter [9:0] on the line 910 are illustrated. The latched values of the 4 LSB of the master counter 902 provides information on the line 912 to indicate when the rising edge of the data signal SDIN occurs, such as at time t3 for this case. This information on the line 912 is fed to the delay blocks 812a and 812b. Based upon this information and the pre-defined offset values stored in the look-up table, the internally-generated serial clock int_SCLK on the line 802a, in this instance, is then generated.

As can be seen, the placement of the rising edge of the serial clock int_SCLK at time t4 is delayed by two pulses of the master clock mclk with respect to the rising edge of the data signal SDIN at the time t3. The difference between the times t3 and t4 is defined to be the "offset". As a result, the edge placement at the time t4 is designed to occur substantially at the center of the positive half cycle of the signal SDIN, thereby ensuring safe data capture by proper set-up and hold time for the latching in of the data.

However, since the serial clock SCLK frequency could be the same as the frequency of the master clock detector 508 of FIG. 9 must be changed. It should be understood by those skilled in the art that the edge detector 508 of FIG. 9 is appropriate for the non-TDM mode and for the TDM mode in the single speed and in the double speed. Thus, only for the TDM mode with quad speed, additional circuitry of FIG. 11 for implementing of another portion of the edge detector 508 of FIG. 9 to handle the special case for the TDM mode with quad speed is provided.

Figure 11:
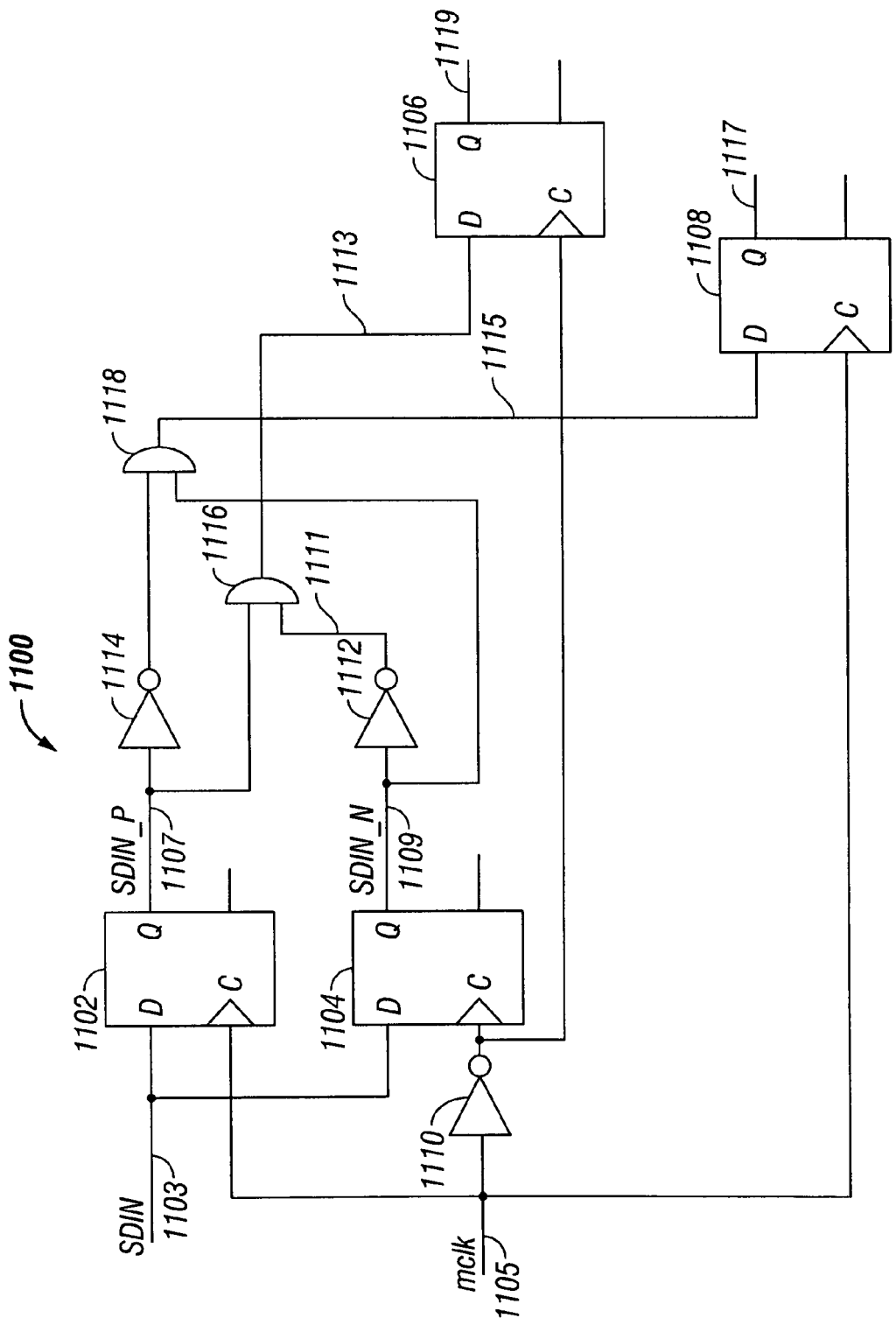
FIG. 11 is a more detailed block diagram of a second portion of the serial mode detector block 508 of FIG. 5.

In FIG. 11, there is illustrated a schematic diagram of the additional circuitry 1100 of the edge detector 508 which is formed of four flip-flops (FF) 1102-1108, three inverters 1110-1114, and two AND logic gates 1116, 1118. The data signal SDIN on line 1103 is applied to the D-inputs of the FF 1102 and 1104, and the master clock mclk on line 1105 is applied to the clock C-input of the FF 1102 and 1108. The inverted master clock mclk_bar at the output of the inverter 1110 is applied to the clock C-input of the FF 1104 and 1106. The Q output of the FF 1102 on line 1107 defines a signal SDIN_P, and the Q output of the FF 1104 on line 1109 defines a signal SDIN_N.

The signal SDIN_P from the output of the FF 1102, and the signal SDIN_Nbar on line 1111 from the output of the inverter 1112 are fed to the respective inputs of the AND gate 1116. The output of the AND gate 1116 on line 1113 is fed to the D-input of FF 1106. The output of the AND gate 1118 on line 1115 is fed to the D-input of the FF 1108. The C-input of the FF 1106 receives the signal mclk_bar from the output of the inverter 1110, and the C-input of the FF 1108 receives the signal mclk. The Q outputs of the FF 1108 and 1106 on respective lines 1117 and 1119 will be latched and determines which one of the respective positive and negative edges of the signal mclk will be used to clock in the data signal SDIN. The Q outputs of the FF 1106 and 1108 will be reset at the beginning of each cycle of the frame clock LRCK so as to allow continuous detection of the master clock mclk, thereby preventing any jitter in the master clock mclk relative to the signal SDIN.

FIG. 12 is a timing diagram showing the signals at the relevant lines of FIG. 11 when the rising edge of the signal mclk is used to clock in the data signal SDIN. As can be seen, the first rising edge of the signal mclk occurs at time t5 during the positive cycle of the signal SDIN. The positive cycle ends at the first falling edge at time t6. The second rising edge of the signal mclk occurs at time t7, and the second falling edge thereof occurs at time t8. The rising edges of the signal mclk will produce the signal SDIN_P on the line 1107, and the falling edges thereof will produce the signal SDIN_N on the line 1109. The output of the AND gate 1116 produces the signal on the line 1113, and the output of the AND gate 1118 produces the signal on the line 1115.

The falling edges at the times t6 and t8 will cause the signal on the output line 1117 from the FF 1108 to be generated so as to control the positive edges of the signal mclk for clocking in the data signal SDIN. No signal is produced on the output line 1119 from the FF 1106. The signals on the output lines 1117 and 1119 are both fed to each of the delay blocks 812a and 812b of FIGS. 8(a) and 8(b).

FIG. 13 is a timing diagram showing the signals at the relevant lines of FIG. 11 when the falling edge of the signal mclk is used to clock in the data signal SDIN. Similarly, the first falling edge of the signal mclk occurs at time t9 during the positive cycle of the signal SDIN. The negative cycle ends at the first rising edge at time t10. The second falling edge of the signal mclk occurs at time t11, and the second rising edge thereof occurs at time t12. The rising edges of the signal mclk will produce the signal SDIN_P on the line 1107, and the falling edges thereof will produce the signal SDIN_N on the line 1109. The output of the AND gate 1116 produces the signal on the line 1113, and the output of the AND gate 1118 produces the signal on the line 1115. The rising edges at the times t10 and t12 will cause the signal on the output line 1119 from the FF 1106 to be generated so as to control the negative edges of the signal mclk for clocking in the data signal SDIN. No signal is produced on the output line 1117 from the FF 1108.

Figure 14:
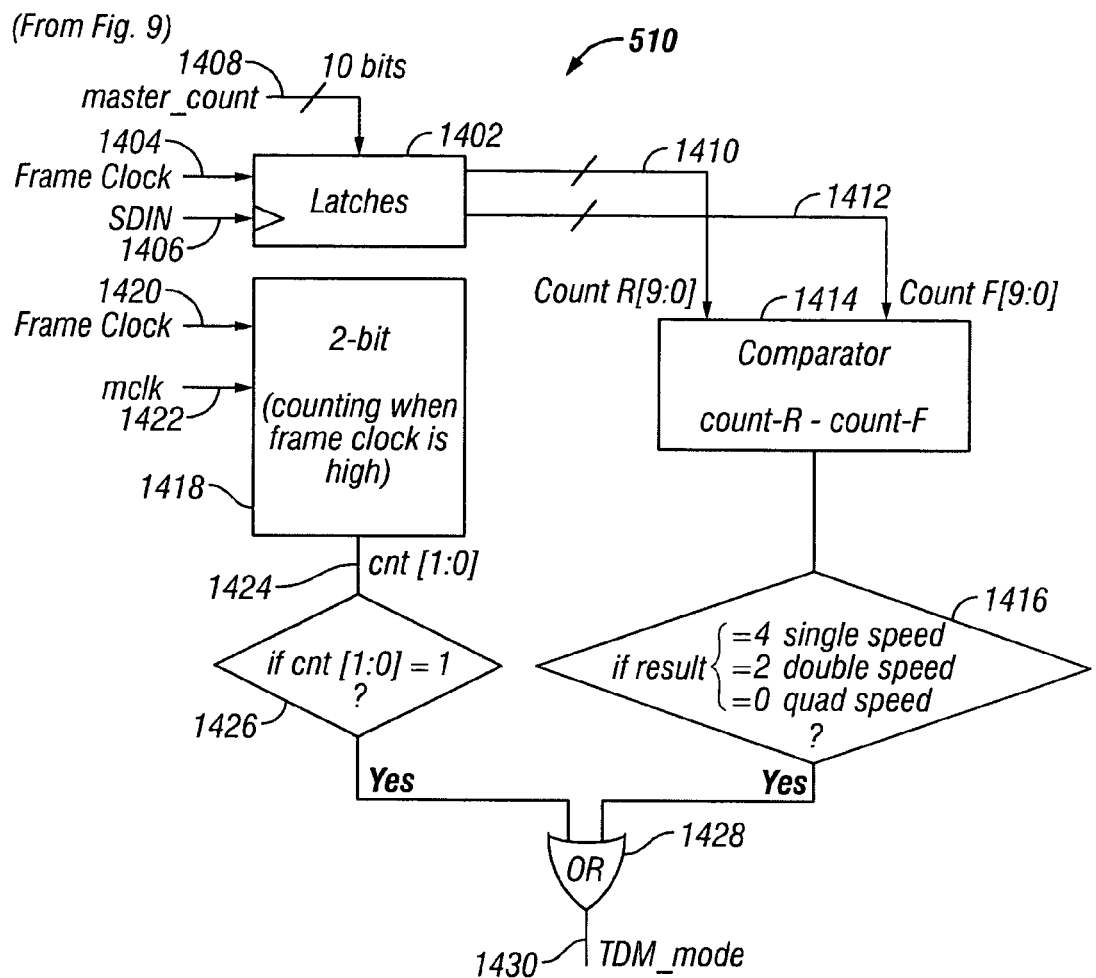
FIG. 14 is a more detailed block diagram of the serial mode detector block 510 of FIG. 5.

FIG. 14 is a more detailed block diagram of the serial mode detector block 510 of FIG. 5. The serial mode detector block 510 is used to detect automatically whether the sampling rate is in the non-TDM mode or TDM mode. The detector block 510 includes latches 1402 which receives on its first input line 1404 the frame clock LRCK and on its second input line 1406 the serial data SDIN. A third input to the latches 1402 is on line 1408 which receives the count signal master_counter [9:0] from the 10-bit master counter 902 of FIG. 9. A first output of the latches on line 1410 provides a master count latched signal Count R[9:0], which is latched on the rising edge of the data signal SDIN. A second output of the latches on line 1412 provides a master count latched signal Count F[9:0], which is latched to the falling edge of the data signal SDIN.

The detector block 510 further includes a comparator 1414 which is used to compare the resulting count values Count R[9:0] and Count F[9:0] from the latches 1402. In the decision block 1416, if the value difference between the count signals Count R[9:0] and Count F[9:0] is equal to 4, then the sampling rate is at single speed. If the value difference is equal to 2, then the sampling rate is at double speed. If the value difference is equal to zero, then the sampling rate is at quad speed. Further, this value difference also indicates that the sampling rate is in the TDM mode. Otherwise, it is in the non-TDM mode.

The detector block 510 also includes a 2-bit counter 1418 which receives on its first input line 1420 the frame clock and on its second input line 1422 the master clock signal mclk. The counter 1418 counts the number of cycles of the signal mclk occurring when the frame clock is high and provides an output count signal Count [1:0] on line 1424. In the decision block 1426, if the count signal Count [1:0] is equal to one, then this means that the sampling rate is in the TDM mode. The OR logic gate 1428 receives the outputs from the decision blocks 1416 and 1426 and generates a logic output signal TDM_mode on line 1430 if either of the decision blocks is true, thereby indicating that the sampling rate is in the TDM mode.

Optionally, a user might set the mode detector 510 to be in either the non-TDM mode or the TDM mode through the programming of registers which is sent via a control port line 422 of FIG. 4 or 5.

From the foregoing detailed description, it can thus be seen that the present invention provides a DAC audio system and a method for clock mode determination utilizing SCLK auto-detection and generation circuitry at a serial port in which the number of input pins on an integrated circuit is reduced. The present SCLK auto-detection and generation circuitry includes a SCLK detector circuit, a serial mode detector circuit, a SCLK generator circuit, a multiplexer, and an edge detector circuit. The SCLK detector circuit is used to detect whether or not an external serial clock signal is present and to generate a selection signal. The serial mode detector is used to detect whether an incoming data signal is in a non-TDM mode or a TDM mode and to generate a mode signal.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

The invention claimed is:

1. SCLK auto-detection and generation circuitry for use in a digital-to-analog converter audio system in which the number of input pins is reduced, said auto-detection and generation circuitry comprising:
   a multiplier circuit including a Phase Lock Loop ("PLL") circuit responsive to a LRCK signal for generating an internal PLL signal which is a predetermined multiple of said LRCK signal;
   SCLK detection circuit responsive to said LRCK signal and adapted to be coupled to an external serial clock signal input pin for detecting whether an external serial clock signal is present and for generating a selection signal;
   internal SCLK generator circuit responsive to said internal PLL signal for generating a first internal serial clock signal and a second internal serial clock signal; and
   multiplexer circuit responsive to said selection signal for selecting said external serial clock signal when said external serial clock signal is detected and for selecting one of said first and second internal serial clock signals when said external serial clock signal is not detected.

2. SCLK auto-detection and generation circuitry as claimed in claim 1, wherein said internal SCLK generator circuit includes a first selected divider network for dividing a frequency of said internal master clock signal to generate a first plurality of divided-down master clock signals.

3. SCLK auto-detection and generation circuitry as claimed in claim 2, wherein said first selected divider network includes a divide-by-sixteen divider, a divide-by-eight divider and a divide-by-four divider in the non-TDM mode for generating said first plurality of said divided-down master clock signals in which a corresponding one is selected to be said first internal serial clock signal.

4. SCLK auto-detection and generation circuitry as claimed in claim 3, further comprising second multiplexer circuit responsive to a second selection signal for selecting said divide-by-sixteen divider in a single speed mode, said divide-by-eight divider in a double speed mode, and said divide-by-four divider in a quad speed mode.

5. SCLK auto-detection and generation circuitry as claimed in claim 4, further comprising a second selected divider network which includes a divide-by-four divider, a divide-by-two divider and a divide-by-one divider in the TDM mode for generating a second plurality of said divided-down master clock signals in which a corresponding one is selected to be said second internal serial clock signal.

6. SCLK auto-detection and generation circuitry as claimed in claim 5, further comprising third multiplexer circuit responsive to a third selection signal for selecting said divide-by-four divider in a single speed mode, said divide-by-two divider in a double speed mode, and said divide-by-one divider in a quad speed mode.

7. SCLK auto-detection and generation circuitry as claimed in claim 1, wherein said SCLK detection circuit includes a counter for counting the number of cycles of said external serial clock signals in a period of said LRCK signal to generate a count signal and logic circuitry responsive to said count signal for generating an output signal indicative of the presence of said external serial clock signal when the counting signal is equal to or exceeds a predetermined number.

8. SCLK auto-detection and generation circuitry as claimed in claim 1, further comprising edge detector means responsive to said internal PLL signal and a serial data input signal for generating a start point signal.

9. SCLK auto-detection and generation circuitry as claimed in claim 8, wherein said edge detector means includes a master counter for receiving said internal master clock signal and said serial data input signal and for counting the number of cycles of said internal master clock signal in a period of said serial data input signal to generate said start point signal indicative of the rising edge of said serial data input signal.

10. SCLK auto-detection and generation circuitry as claimed in claim 9, wherein said internal SCLK generator means is also responsive to said start point signal so as to ensure safe data capture by proper set-up and hold time when said serial data input signal is being latched in with one of said first and second internal serial clock signals.

11. SCLK auto-detection and generation circuitry as claimed in claim 1, furthering comprising serial mode detector means responsive to the duty cycle of said internal PLL signal, said LRCK signal and said serial data input signal for generating a TDM mode signal.

12. SCLK auto-detection and generation circuitry as claimed in claim 11, wherein said internal SCLK generator means is responsive to said TDM mode signal for generating said first internal serial clock signal when said TDM mode signal is one value and for generating said second serial clock signal when said TDM mode signal is another value.

13. SCLK auto-detection and generation circuitry for use in a DAC audio system, comprising:
a SCLK detector circuit used to detect whether an external serial clock signal is present and to generate a selection signal;
a serial mode detector responsive to the duty signal of an internal PLL signal for generating a mode signal which is one value for the non-TDM mode and is another value in the TDM mode;
an internal SCLK generator circuit responsive to said mode signal and said internal PLL signal for generating a first internal serial clock signal for the non-TDM mode and a second internal serial clock signal for the TDM mode;
a multiplexer responsive to said selection signal for selecting said external serial clock signal when said external serial clock signal is detected and for selecting one of said first and second internal serial clock signals when said external serial clock signal is not detected;
an edge detector circuit responsive to an internal master clock signal and a serial data input signal for generating a start point signal; and
said internal SCLK generator circuit also being responsive to said start point signal so as to ensure safe data capture by proper set-up and hold time when said serial data input signal is being latched in with one of said first and second internal serial clock signals.

14. SCLK auto-detection and generation circuitry as claimed in claim 13, wherein said internal SCLK generator circuit includes a first selected divider network for dividing a frequency of said internal master clock signal to generate a first plurality of divided-down master clock signals.

15. SCLK auto-detection and generation circuitry as claimed in claim 14, wherein said first selected divider network includes a divide-by-sixteen divider, a divide-by-eight divider and a divide-by-four divider in the non-TDM mode for generating said first plurality of said divided-down master clock signals in which a corresponding one is selected to be said first internal serial clock signal.

16. SCLK auto-detection and generation circuitry as claimed in claim 15, further comprising a second multiplexer responsive to a second selection signal for selecting said divide-by-sixteen divider in a single speed mode, said divide-by-eight divider in a double speed mode, and said divide-by-four divider in a quad speed mode.

17. SCLK auto-detection and generation circuitry as claimed in claim 16, further comprising a second selected divider network which includes a divide-by-four divider, a divide-by-two divider and a divide-by-one divider in the TDM mode for generating a second plurality of said divided-down master clock signals in which a corresponding one is selected to be said second internal serial clock signal.

18. SCLK auto-detection and generation circuitry as claimed in claim 17, further comprising third multiplexer responsive to a third selection signal for selecting said divide-by-four divider in a single speed mode, said divide-by-two divider in a double speed mode, and said divide-by-one divider in a quad speed mode.

19. SCLK auto-detection and generation circuitry as claimed in claim 13, further comprising a PLL circuit for performing frequency multiplication on a frame clock signal in order to generate said internal PLL signal.

20. SCLK auto-detection and generation circuitry as claimed in claim 13, wherein said SCLK detector circuit includes a counter for counting the number of cycles of an external serial clock signal in a period of a frame clock signal to generate a count signal and logic means responsive to said count signal for generating an output signal indicative of the presence of said external serial clock signal when the counting signal is equal to or exceeds a predetermined number.

21. SCLK auto-detection and generation circuitry as claimed in claim 13, wherein said edge detector circuit includes a master counter for receiving an internal master clock signal and a serial data input signal and for counting the number of cycles of said internal master clock signal in a period of said serial data input signal to generate said start point signal indicative of the rising edge of said serial data input signal.

22. A method for using SCLK auto-detection and generation circuitry in a DAC audio system, comprising:
detecting in a SCLK detector circuit whether an external serial clock signal is present and generating a selection signal;
detecting in a serial mode detector the duty cycle of an internal PLL signal for generating a mode signal which is one value for the non-TDM mode and is another value in the TDM mode;
generating in an internal SCLK generator circuit a first internal serial clock signal for the non-TDM mode and a second internal serial clock signal for the TDM mode in response to the mode signal and said internal PLL signal;
selecting the external serial clock signal when the external serial clock signal is detected and selecting one of the first and second internal serial clock signals when the external serial clock signal is not detected in response to the selection signal;

generating a start point signal in an edge detector circuit in response to an internal master clock signal and a serial data input signal; and ensuring set up and hold time when the serial data input signal is being latched in with one of the first and second internal serial clock signals in response to the start point signal.

23. A method for using SCLK auto-detection and generation circuitry as claimed in claim 22, wherein the step of generating the first internal serial clock signal includes dividing in a first selected divider network a frequency of the master clock signal to generate a first plurality of divided-down master clock signals in the non-TDM mode.

24. A method for using SCLK auto-detection and generation circuitry as claimed in claim 23, wherein the step of generating the second internal serial clock signal includes dividing in a second selected divider network the frequency of the master clock signal to generate a second plurality of divided-down master clock signals in the TDM mode.

* * * * *